(No Model.) 3 Sheets—Sheet 3.
W. M. UNDERHILL.
ANIMAL STALL.

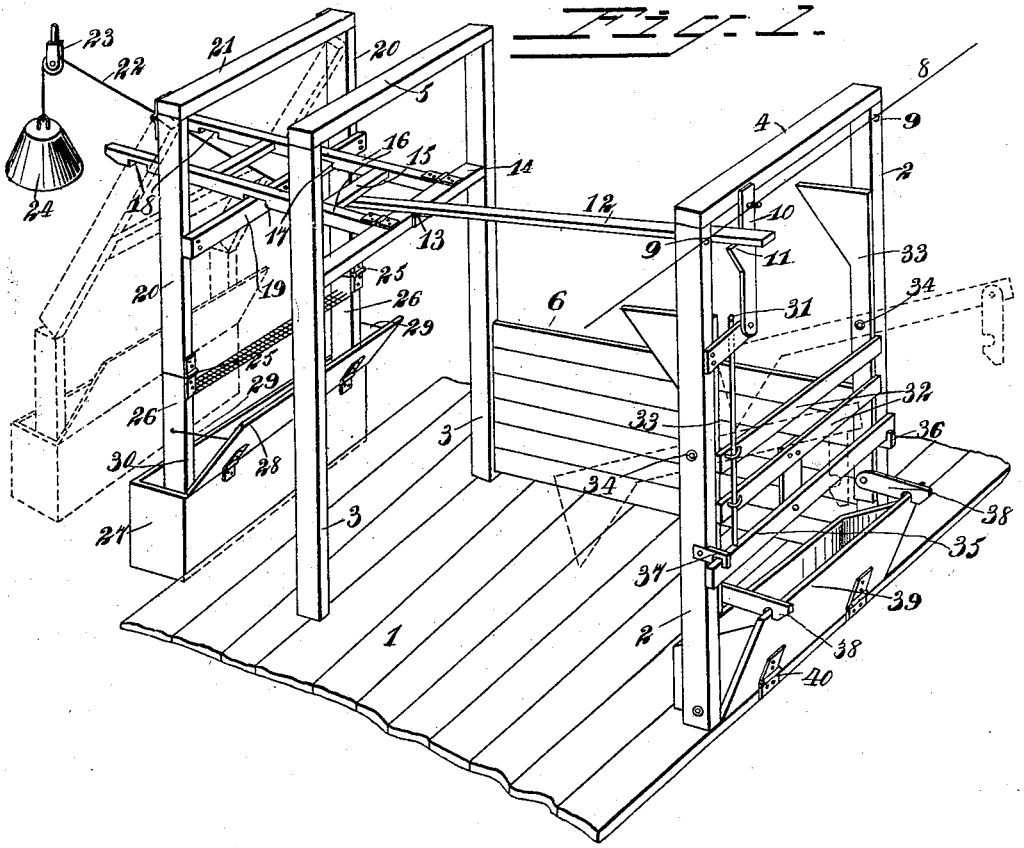

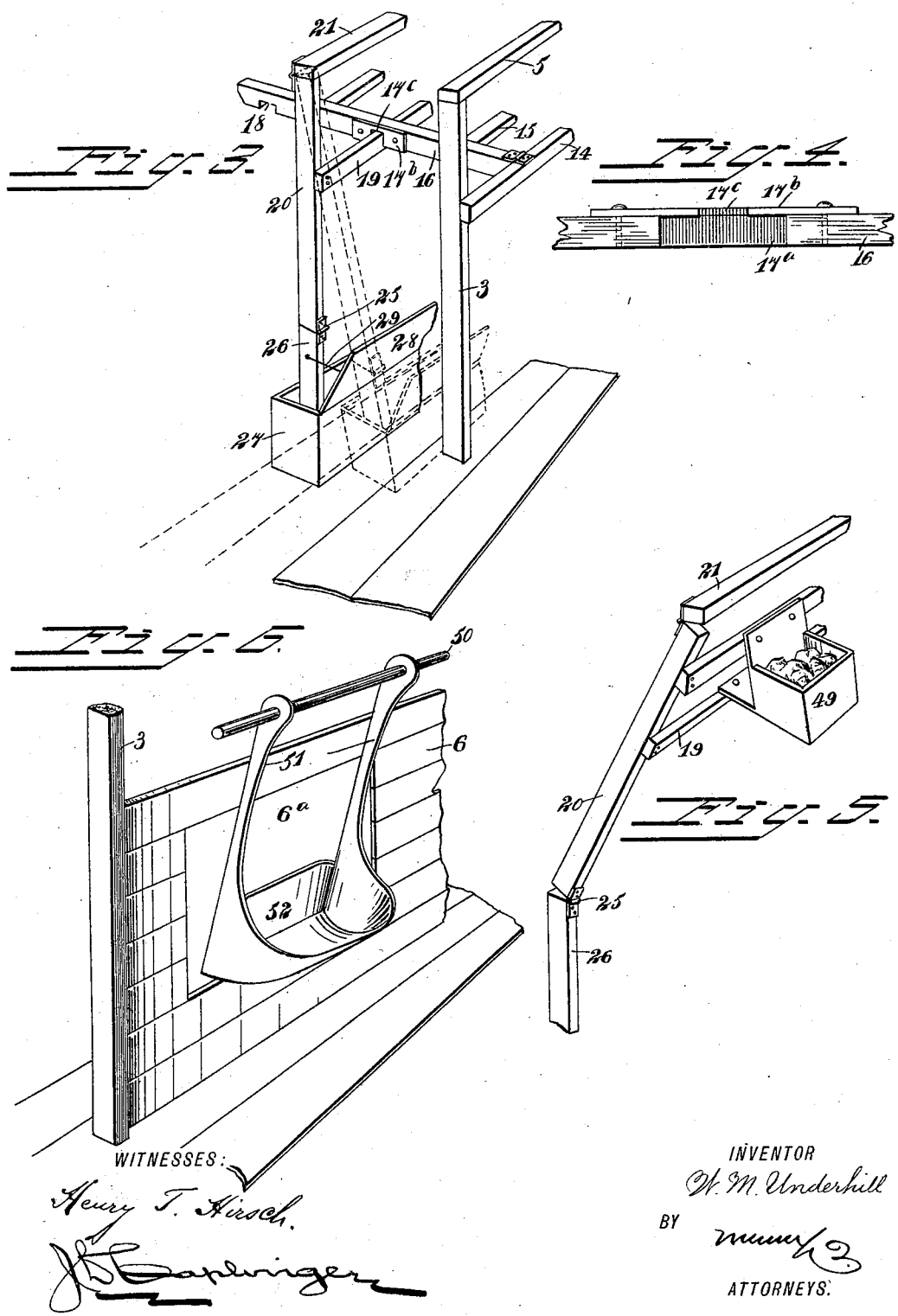

No. 595,504. Patented Dec. 14, 1897.

WITNESSES:
Henry T. Hirsch.

INVENTOR
W. M. Underhill.
BY
ATTORNEYS.

UNITED STATES PATENT OFFICE.

WILLIAM M. UNDERHILL, OF UNDERHILL, WISCONSIN.

ANIMAL-STALL.

SPECIFICATION forming part of Letters Patent No. 595,504, dated December 14, 1897.

Application filed April 7, 1896. Serial No. 586,500. (No model.)

*To all whom it may concern:*

Be it known that I, WILLIAM M. UNDERHILL, of Underhill, in the county of Oconto and State of Wisconsin, have invented certain new and useful Improvements in Self-Adjusting Animal-Stalls, of which the following is a full, clear, and exact description.

This invention relates to certain improvements in stalls for confining animals, and especially cattle, and has for its object to provide a stall of a simple and inexpensive construction having means whereby the barn or stable may, with a minimum of labor, be kept in a cleanly condition, such as is essential, particularly in cow-stables, at all times, and whereby the confined animals may be conveniently fed, attended, or liberated in case of fire.

The invention consists principally in a stall having at its rear portion a chute-board mounted to swing and adapted to stand in an inclined position, so as to receive the droppings and convey the same outside the stall.

The invention also contemplates certain novel features of the construction, combination, and arrangement of the various parts of the improved stall whereby certain important advantages are attained and the device is made simpler, cheaper, and otherwise better adapted and more convenient for use than similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 7:
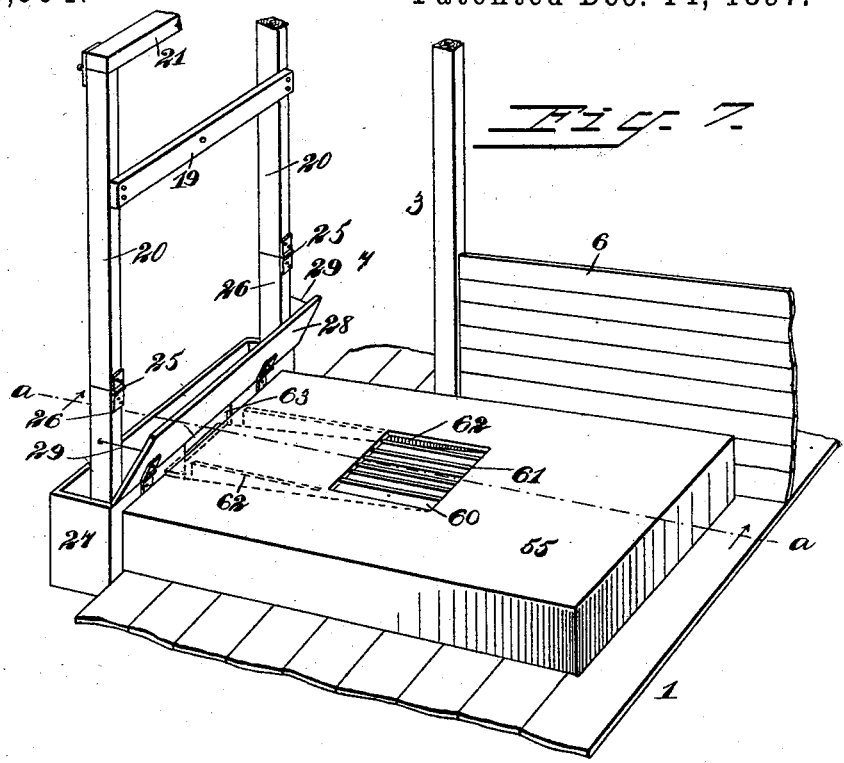
Figure 8:
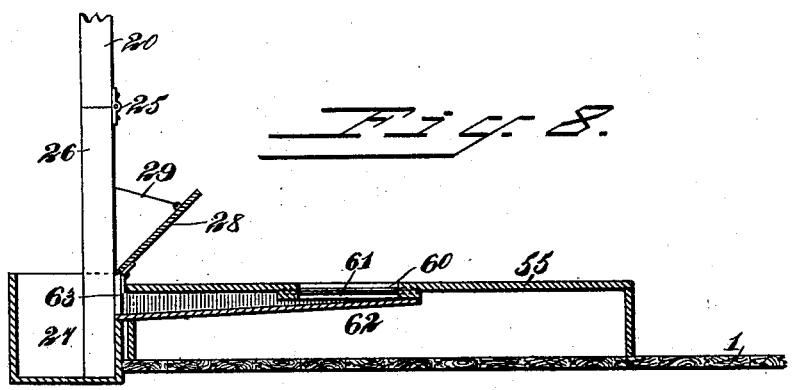

Figure 1 is a perspective view showing a stall constructed in accordance with my invention. Fig. 2 is a perspective view showing a modified construction of one part of the improved stall. Fig. 3 is a fragmentary perspective view showing a modified arrangement of the locking-bars for the rear wall of the stall. Fig. 4 is an enlarged fragmentary detail view showing the same construction. Fig. 5 is a fragmentary perspective view showing another means for counterbalancing the rear wall of the stall. Fig. 6 is a fragmentary perspective view showing a vessel or basin adapted for use in connection with the stall for males. Fig. 7 is a perspective view showing a means to convey the urine from the stall in which male animals are confined; and Fig. 8 is a vertical section showing the same means, the section being taken on the line *a a* in Fig. 7.

In the views, 1 indicates the floor of the barn or stable wherein the stall is arranged, and 2 2 indicate the forward posts of the frame of the stall at the head end thereof.

3 3 are the rear posts of the stall-frame.

The front posts 2 2 are connected at top by a cross-beam 4, and the rear posts 3 3 are similarly connected at their upper end by a cross-beam 5. The cross-beams 4 and 5 may be made to extend along the tops of several stalls, if desired, or may form part of the barn or stable wherein the stalls are located.

8 indicates a chain or cable guided, as indicated at 9, across the upper portion of the front posts 2 of the stall, to which cable is connected the upper end of a latch-lever 10, pivoted at its lower end to one of said posts 2 and having a shoulder 11, adapted to engage under and support the forward end of an operating bar or lever 12, extending lengthwise of the stall at the upper part thereof and hinged or pivoted, as shown at 13, on a cross-bar 14, connecting the rear posts 3 3 together.

The forward end of the bar or lever 12 is of greater weight than the rear end thereof, and consequently when said forward end is released from the latch-lever 10 it will fall, causing the rear end of the bar or lever 12 to be thrown upward. Said rear end engages under a cross bar or tie 15, uniting the side bars 16 of a locking-frame, said side bars being hinged at their forward ends to the cross-bar 14 and having their rear ends notched or recessed on their under sides, as shown at 17, and adapted to engage a cross-bar 19, uniting the side bars of a tilting frame.

The side bars of the tilting frame are made sectional, the upper sections 20 thereof being connected by the cross-bar 19 and pivoted at their upper ends to a suitable supporting-beam 21, extending over the rear part of the stall, which beam may form part of the framing of the stable or barn, if desired. The lower sections 26 of the side bars of the tilting frame are connected by hinges 25 at their upper ends to the lower ends of the upper sections 20, and said lower sections carry at their lower ends the opposite sides of a box or trough 27, herein shown as rectangular in form and extending across the rear part of the stall.

The box or trough 27 is designed to receive the droppings, to collect the same, and prevent the floor of the stall from being fouled, and to the forward upper edge of said box is pivoted a chute-board 28, held in an inclined position by means of flexible braces 29 at its opposite sides. The box or trough 27 may be made with an open bottom and be arranged to merely guide the droppings into a channel extending behind the stall, or it may be closed and detachable from the side bars of the tilting frame. A netting 30 is arranged above the mouth of the box and over the chute-board to prevent the tail of the animal from becoming fouled.

In some cases it may be desirable to employ the construction shown in Fig. 2, wherein the box 41 is provided with integral upward extensions 42 at its ends, between which extends a bail-like handle 43, having bent ends 44 engaging apertures in the said extensions. The box shown in Fig. 2 has no connection with the tilting frame. It is simply to be used in a common stall and pushed in far enough against the animal to catch the droppings. The box is provided with a chute-board 45, held in an inclined position by flexible braces 46. An inner box or receptacle 47 is adapted to fit in the box or trough 41 and is removable therefrom, for which purpose it is by preference provided with a handle 48. This form of the box is adapted to be set in the rear part of an ordinary stall and does not require to be secured in place in any way, although it may be so secured, if desired; and in some cases it may be desirable to dispense with the box-like trough or receptacle entirely and to simply pivot the chute-board in the rear part of the stall in position to convey the droppings outside the stall.

In operation the chute-board of the stall box or trough will be thrown forward by its own weight in position to receive and guide the droppings into the box or elsewhere outside the stall, and it will be seen that the animal may lie down or move about at will without deranging the parts. When it is desired to release all the animals at once from the stalls, the cable or chain 8 is pulled to disengage the latch-levers 10 from the bars 12, whereupon said bars fall by their own weight and act to raise the locking-frames, whereby the cross-bars 19 of the tilting frames are disengaged from the notches 17. When the locking-frames are thus raised, the tilting frames will be swung backward and raised, as shown in dotted lines in Fig. 1, so as to open the back of the stalls for the passage of the animals therefrom; but when any less than the whole number of animals are to be released the locking-frames are raised individually by hand.

To hold the tilting frame raised, the rear ends of the side bars 16 of the locking-frame are provided with notches or recesses 18 in their under sides, adapted for engagement with the cross-bar 19 of the tilting frame, and said tilting frame is provided with a counterbalance-weight 24, connected with the frame by a cord 22, passing over a suitably-arranged snatch-block 23, as shown in Fig. 1.

In some cases the counterbalance 24 may be dispensed with, and in lieu thereof a box 49 may be carried on the frame, as shown in Fig. 5, said box being loaded with stone or scrap-iron, and, if desired, the construction of the locking-frame shown in Figs. 3 and 4 may be employed, wherein the side bars 16 of said frame are recessed, as shown at $17^a$, and are provided with adjustable plates $17^b$, secured to their sides, said plates being centrally recessed, as shown at $17^c$, for engagement with the cross-bar 19. In this way the plates $17^b$ may be adjusted so as to adapt the locking-frame to different conditions.

When it is desired to release the cattle from the fronts of the stalls, said fronts are made open, and between the posts 2 is hinged or pivoted a swinging front comprising cross-slats 32, connected at their ends to side bars 33, arranged inside the posts 2, to which they are pivoted, as shown at 34 in Fig. 1. The upper ends of the side bars 33 are preferably weighted, so that when said front is released, as will be hereinafter set forth, it will swing to a horizontal position to permit the exit of the animal from the stalls.

A locking-beam 35 is centrally pivoted at the lower part of the swinging front and has its ends arranged to move in opposite directions into and out of engagement with keepers 36 and 37 in the posts 2, and on one end of said beam is arranged to bear the lower end of a slide bar or pin 31, guided on the slats 32 of the stall-front and arranged with its upper end in the path of the forward end of the bar or rod 12. In this way when the bar or rod 12 falls its front end strikes on the pin 31 and moves the same longitudinally, so as to swing the beam 35 pivotally and disengage the ends thereof from the keepers 36 and 37. When the stall-front is released as described, the weighted upper ends of the side bars 33 thereof cause the same to swing into a horizontal position, so as to open the front of the stall for the passage of the animal. In connection with said swinging front I employ a manger 39, hinged at its bottom front edge, as seen at 40. When such a manger is employed, the lower ends of the side bars 33 of the stall-front are provided with hooks 38, having their ends arranged to engage the manger and hold the same in a raised position normally, but adapted when the stall-front is released to release the manger and permit the same to fall to the floor.

In connection with my improvements I provide means for conducting the urine from the stalls where male animals are confined, and in Fig. 6 I have shown one of such means, consisting of a vessel 52, having arms 51, secured on a shaft 50, extending along the side 6 of the stall, said vessel being adapted to swing toward and from the side 6 of the stall, which side is provided with a recess 6ª to receive the vessel.

In Figs. 7 and 8 I have shown another such means wherein the stall is provided with a raised platform 55, resting on its floor 1, said platform being hollow on its under side, as shown in Fig. 8. In the top of the platform is formed an opening 60, covered by a grating 61, and beneath said opening is arranged a rearwardly-extending chute or channel 62, inclined down toward its rear end. The box 27 is adapted to fit against the rear face of the platform 55, and its front wall is recessed, as shown at 63, to receive the rear end of the chute or channel 62.

From the above description it will be seen that the stall constructed in accordance with my invention is of an extremely simple and inexpensive construction and permits of readily releasing the animal when required and also provides means whereby the stable or barn may be kept clean and wholesome at all times and with a minimum of labor, and it will also be obvious from the above description that the invention is susceptible of some modification without material departure from its principles and spirit, and for this reason I do not wish to be understood as limiting myself to the precise form of the parts herein set forth.

The box or trough swinging backward and forward with the tilting frame materially varies the length of the stall. This gives freedom to the animal and makes the stall self-adjustable.

Having thus fully described my invention, I claim as new and desire to secure by Letters Patent—

1. A stall having a pivoted wall adapted when released to swing pivotally to an open position, a beam to lock the wall in its closed position, a bar normally held in one position, and adapted when released to actuate said beam to release the wall, and a latch to hold said bar against movement, substantially as set forth.

2. In a stall, the combination of a tilting frame pivoted at its upper part, a locking-frame arranged to engage the tilting frame to hold the same in a lowered position, a pivoted bar arranged when released to fall, and connected to and adapted to disengage the locking-frame from the tilting frame, and a latch to hold said bar against movement, substantially as set forth.

3. In a stall, the combination of a pivotally-mounted front wall having means to swing it to an open position when released, a beam centrally pivoted on the front wall, keepers at opposite sides of the front wall to be engaged by said beam to lock the front wall in its closed position, a pin guided longitudinally and arranged to engage the beam, a bar normally held raised and adapted when released to strike said pin and swing said beam out of engagement with the keepers, and a latch to hold the bar raised, substantially as set forth.

4. In a stall, the combination of a tilting frame pivoted at its upper part and having side bars formed of pivotally-connected sections, means to hold the tilting frame in a closed position, means to release said frame and permit the same to swing to an open position, and a box or trough carried on the lower end of the said frame and arranged to stand transversely across the rear part of the stall when said frame is in its lowered position, substantially as set forth.

5. In a stall, the combination of a tilting frame pivoted at its upper part, means to lock and release said frame, a box carried by the frame and arranged when the frame is lowered to stand transversely across the rear part of the stall, a chute-board extending in a forward inclined position from the front of said box, and a netting over the box and chute-board, substantially as set forth.

6. The combination of a box or trough, a chute-board hinged at its edge to one edge of the box and adapted to stand in an inclined position, extensions at the ends of the box, and flexible connections between said extensions and the chute-board, substantially as set forth.

7. In a stall, the combination of a tilting frame, pivoted at its upper part and provided with a cross-bar, a locking-frame having side bars, means to actuate said locking-frame, and notched plates adjustable in the locking-frame, to engage said cross-bar of the tilting frame, substantially as set forth.

8. A stall having a tilting frame and a hinged chute-board movable with the tilting frame, the chute-board being capable of bearing directly against the animal and of moving independently of the tilting frame by direct contact with the animal, substantially as described.

9. A stall having a tilting frame pivoted near its upper portion, a trough or box carried by the tilting frame, a chute-board hinged to the trough or box, and a flexible connection attached to the chute-board and limiting the movement thereof, substantially as described.

10. A stall having a tilting frame adapted when released to move to an open position, a beam capable of locking the tilting frame in its closed position, a bar capable of movement to actuate the beam to release the frame, and means for actuating the bar, substantially as described.

11. In a stall, the combination of a tilting frame, means for locking said frame in a closed position, a pivoted wall for the stall, a lock for the wall, and a bar operatively connected to the tilting frame and pivoted wall and capable of movement to simultaneously release the tilting frame and the pivoted wall, substantially as described.

12. In a stall, the combination of a tilting frame, means tending to raise said frame, a locking device for holding the tilting frame closed, a bar connected to the locking device, a pivoted wall for the stall, the wall having a tendency to open, a locking device for holding the wall in a closed position, and a latch capable of supporting the bar and of permitting the same to simultaneously release each locking device, substantially as described.

13. In a stall, the combination of a tilting frame having a tendency to rise, means for locking the tilting frame in a closed position, a bar connected with said means and capable of movement to release said frame, a pivoted wall, and means capable of holding said wall in a locked position, the bar being capable of operating the locking means for the front wall and said locking means being capable of operation independent of the bar, substantially as described.

14. A stall having a pivoted chute-board extending transversely at the rear portion of the stall, a receptacle at the rear of the chute-board, and flexible connections attached to the chute-board and limiting the forward movement thereof, the chute-board being adapted to fall forward by its own weight against the animal confined in the stall and being adapted to be forced back by its contact with the said animal to nearly an upright position when the animal pushes or backs against the chute-board, substantially as described.

15. A stall having a hinged chute-board, and a flexible connection attached to the free portion of the chute-board the connection being capable of limiting the movement of the chute-board and the chute-board bearing by gravity against the animal and being moved rearward on its hinge as the animal backs against the chute-board, substantially as described.

16. The combination of a box or trough, a chute-board hinged at its edge to one edge of the box and adapted to stand in an inclined position, an extension at one end of the box and a flexible connection between said extension and the chute-board, substantially as described.

WILLIAM M. UNDERHILL.

Witnesses:
O. A. RISUM,
B. D. MILAM.